United States Patent
Mehta

(10) Patent No.: US 10,853,634 B2
(45) Date of Patent: Dec. 1, 2020

(54) METHODS AND SYSTEMS FOR UPDATING A DATABASE BASED ON OBJECT RECOGNITION

(71) Applicant: Citrix Systems, Inc., Fort Lauderdale, FL (US)

(72) Inventor: Sameer Mehta, Los Altos, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 148 days.

(21) Appl. No.: 16/240,342

(22) Filed: Jan. 4, 2019

(65) Prior Publication Data

US 2020/0218890 A1 Jul. 9, 2020

(51) Int. Cl.
*G06K 9/03* (2006.01)
*G06K 9/00* (2006.01)
*G06F 16/55* (2019.01)

(52) U.S. Cl.
CPC ......... *G06K 9/00362* (2013.01); *G06F 16/55* (2019.01); *G06K 9/00288* (2013.01); *G06K 9/03* (2013.01)

(58) Field of Classification Search
CPC .. G06K 9/00362; G06K 9/00288; G06K 9/03; G06F 16/55
USPC ........ 382/103, 115, 116, 118, 117, 124, 125, 382/168, 173, 181, 190, 199, 232, 254, 382/266, 305
See application file for complete search history.

(56) References Cited

U.S. PATENT DOCUMENTS

| | | | |
|---|---|---|---|
| 9,111,130 B2* | 8/2015 | Heckman | G06K 9/00248 |
| 10,620,981 B2* | 4/2020 | Thomas | H04L 43/06 |
| 2008/0040211 A1* | 2/2008 | Walker | G06Q 30/0247 |
| | | | 705/14.38 |
| 2015/0278453 A1* | 10/2015 | Joao | G16H 10/60 |
| | | | 705/3 |
| 2016/0132728 A1* | 5/2016 | Choi | G06K 9/6215 |
| | | | 382/103 |
| 2020/0074359 A1* | 3/2020 | Subramanian | G06N 20/20 |

* cited by examiner

*Primary Examiner* — Sheela C Chawan
(74) *Attorney, Agent, or Firm* — Foley & Lardner LLP

(57) ABSTRACT

The systems and methods discussed herein provide for a method that includes receiving, by a device, a first image of a plurality of individuals. The method further includes identifying, by the device from a database comprising images of individuals, a plurality of individuals within the first image. The method further includes for each identified individual within the first image, by the device, identified individual with a first value. The method further includes, generating, by the device to a second device, a record comprising identifications of each identified individual within the first image and the first value.

20 Claims, 5 Drawing Sheets

| Person | Classification | Eigenvalue | Image | Hash Value |
|---|---|---|---|---|
| John Smith | Supervisor | -1/30 | | 11458912610622284256 |
| John Doe | Employee | -1/40 | | 16458912710628288526 |
| Jane Doe | Supervisor | -1/27 | | 17458912410326282956 |
| Bob Jackson | Employee | -1/15 | | 14958992690622283256 |
| Patricia Ford | Employee | -1/10 | | 14458212640524254253 |

FIG. 3

| Person | Classification | Present at meeting | Number of Meetings Attended | Number of Meetings Missed |
|---|---|---|---|---|
| John Smith | Supervisor | X | 25 | 0 |
| John Doe | Employee |  | 30 | 15 |
| Jane Doe | Supervisor |  | 45 | 3 |
| Bob Jackson | Employee | X | 8 | 1 |
| Patricia Ford | Employee | X | 14 | 5 |

FIG. 4

METHODS AND SYSTEMS FOR UPDATING A DATABASE BASED ON OBJECT RECOGNITION

FIELD OF THE DISCLOSURE

The present application generally relates to using object recognition techniques to update a database.

BACKGROUND OF THE DISCLOSURE

Various data entry tasks required by enterprises from employees may be tedious, such as recording attendance at a meeting, tracking receipts for reimbursement, or other such data entry tasks. Though these tasks may be important to the enterprise, there is frequently low compliance from employees or users due to the effort required, frustration with data entry systems, or other such issues. Additionally, these systems may be prone to errors in data entry or even fraud, requiring extensive manual review.

BRIEF SUMMARY OF THE DISCLOSURE

An improved system for data entry may leverage cameras, along with facial recognition, object recognition, and optical character recognition technologies, as well as applying comparison rules to automatically detect erroneous or fraudulent entries. A system may receive one or more photos from a device associated with a user or individual, and may receive data values to be associated with objects or individuals (including potentially one or more additional users or individuals) identified in the photos (either via optical character recognition from one or more photos or via data values entered manually or received from another device). Values can be numeric representations of aspects associated with a picture such as, but not limited to, a number in a picture, a final total of a bill, a count of the number of items or people, a rating, a time frame, a distance, etc. The system may identify the individuals or objects based on a set of training data, such as an employee directory, and may associate the data values with the individuals or objects, either directly or proportionally based on the number of individuals or objects. Such associations of individuals, objects, and/or data values or portions of data values may be recorded in a database of the system for further tracking and analysis, as well as other uses by the enterprise (including marketing, accounts payable, or other such uses). Users need not manually identify the individuals or objects or associations with the data values, reducing end user effort and reducing non-compliance. Rules may be applied to each association of object, individual, and/or data value, as well as across multiple associations, to automatically detect erroneous or fraudulent entries.

In some implementations, if the system determines that an association is invalid, the device can return an error message to the user device that provided the picture and value or an administrative device instead of using processing power to identify objects or individuals in the picture and to update the database. In some implementations, the device can determine the validity of an association between a picture and value by determining the location and time at which a picture and a value were generated or entered and comparing the location and time associated with the picture with the location and time associated with the value. If the respective locations or times are too far apart, the device can return an error message instead of updating the database. If the locations and times are not too far apart, the device can identify individuals in the picture and the value and update the database accordingly.

Because the device can determine if associations are valid before identifying individuals and values, the device can save valuable processing time and resources by not using time and resources to identify individuals and values in invalid associations. Also, the device may not need to use resources to perform another or an additional scan of the pictures and values for indications of fraud because the device may catch invalid associations before performing any operations to update the database.

Further, previous systems have not been able to use the information in pictures and associated with values to do much more than determine what is in the picture. The present system can be used to use and communicate information, such as classifying people in a picture as employees within a company, counting the number of people in a board meeting and determining who each person is, etc., in an efficient and accurate fashion.

In one aspect, the present disclosure is directed to a method including receiving, by a device, a first image of a plurality of individuals. The method further includes identifying, by the device from a database comprising images of individuals, a plurality of individuals within the first image and associating each identified individual within the first image with a first value. The method further includes generating, by the device to a second device, a record comprising identifications of each identified individual within the first image and the first value.

In one aspect, the present disclosure is directed to the method wherein each of the first image and the first value is associated with a common characteristic related to generation of the image and receipt of the value by the first device. The method further comprises determining, by the device, that a difference between the characteristic associated with the first image and the characteristic associated with the first value is less than a threshold.

In another aspect, the present disclosure is directed to the method wherein associating each identified individual within the first image with the first value is performed responsive to the determination that the difference is less than the threshold.

In another aspect, the present disclosure is directed to the method wherein the characteristic associated with the first image comprises a time to generate the first image, the characteristic associated with the first value comprises a time of receipt of the first value by the device, and the threshold comprises a duration between two time characteristics.

In another aspect, the present disclosure is directed to the method, wherein the characteristic associated with the first image comprises a location at which the first image was generated, the characteristic associated with the first value comprises a location of the device during receipt of the first value by the device, and the threshold comprises a distance between two location characteristics.

In another aspect, the present disclosure is directed to the method further comprising associating the first image and the first value, by the device, responsive to the determination that the difference is less than the threshold. The method further comprises receiving, by the device, a second image of a plurality of individuals and the first value. The method further comprises transmitting, by the device to the second device, an indication that an association between the second image and the first value is invalid, responsive to the first image and the first value being associated.

In another aspect, the present disclosure is directed to the method, wherein a difference between a characteristic associated with the second image and the characteristic associated with the first value is less than the threshold. Also, transmitting the indication that the association between the second image and the first value is invalid is performed despite the difference between the characteristic associated with the second image and the characteristic associated with the first value being less than the threshold.

In another aspect, the present disclosure is directed to the method, wherein associating each identified individual with the first value further comprises determining a number of individuals within the first image and associating each identified individual with a second value comprising the first value divided by the number of identified individuals.

In another aspect, the present disclosure is directed to the method wherein associating each identified individual with the first value further comprises retrieving, by the device from the database, a classification of each identified individual within the first image. The method further comprises associating, by the device a first individual of the identified individuals with the first value, responsive to the first individual having a first classification. The method further comprises associating, by the device, at least one additional individual of the identified individuals with a second value, responsive to each additional identified individual having a different, second classification.

The systems and methods discussed herein provide for a system for generating associations between optical entered data sets. The system comprises a device comprising a processor in communication with an image capture device, a memory for storing a database of images of individuals, and a network interface. The processor is configured to receive, from the image capture device, a first image of a plurality of individuals, and a second image that includes a first value. The processor is also configured to identify, from the database, a plurality of individuals in the first image, and for each identified individual in the first image, associate the identified individual with the first value. The network interface is configured to generate, to a second device, a record comprising identifications of each identified individual within the first image and the association with the first value.

In one aspect, the present disclosure is directed to the system, wherein each of the first image and the second image is associated with a common characteristic related to generation of the image and receipt of the value by the first device and wherein the processor is further configured to determine that a difference between the image characteristic associated with the first image and the image characteristic associated with the second image is less than a threshold.

In another aspect, the present disclosure is directed to the system, wherein the processor is further configured to associate each identified individual within the first image with the first value, responsive to the determination that the difference is less than the threshold.

In another aspect, the present disclosure is directed to the system, wherein the common characteristic comprises a time to generate the image, and the threshold comprises a duration.

In another aspect, the present disclosure is directed to the system, wherein the common characteristic comprises a location at which the image was generated, and the threshold comprises a distance between two location characteristics.

In another aspect, the present disclosure is directed to the system, wherein the processor is further configured to associate the first image and the second image, responsive to the determination that the difference is less than the threshold.

The processor is further configured to receive, from the camera, a third image of a plurality of individuals and the second image comprising the first value. The network interface is further configured to transmit, to the second device, an indication that an association between the first image and third image is invalid, responsive to the first image and second image being associated.

In another aspect, the present disclosure is directed to the system, wherein a difference between an image characteristic associated with the third image and the image characteristic associated with the second image is less than the threshold. Transmitting the indication that the association between the third image and the first value is invalid is performed despite the difference between the characteristic associated with the second image and the characteristic associated with the first value being less than the threshold.

In another aspect, the present disclosure is directed to the system, wherein the processor is further configured to determine a number of individuals within the first image and associate each identified individual with a second value comprising the first value divided by the number of identified individuals.

In another aspect, the present disclosure is directed to the system, wherein the processor is further configured to retrieve, from a database, a classification of each identified individual in the first image. The processor is also configured to associate a first individual of the identified individuals with the first value, responsive to the first individual having a first classification. The processor is also configured to associate at least one additional individual of the identified individuals with a second value, responsive to each additional identified individual having a different, second classification.

The systems and methods discussed herein provide for a non-transitory computer-readable medium, comprising instructions that, when executed by the processor of a device, cause the processor to receive, from an image capture device in communication with the device, a first image of a plurality of individuals, and a second image comprising a first value. The instructions also cause the processor to identify, from a database comprising images of individuals, each of the plurality of individuals in the first image. The instructions also cause the processor to, for each identified individual of plurality of individuals in the first image, associate the identified individual with the first value. The instructions also cause the processor to generate, to a second device, a record comprising identifications of each identified individual within the first image and the association with the first value.

In another aspect, the present disclosure is directed to instructions that cause the processor to determine that a difference between an image characteristic associated with the first image and an image characteristic associated with the first value is less than a threshold. Responsive to the determination that the difference is less than the threshold, the instructions cause the processor to associate each identified individual within the first image with the first value, and associate the first image and the second image. The instructions also cause the processor to receive, from the image capture device, a third image of a plurality of individuals, the third image comprising the first value. The instructions also cause the process to transmit, to the second device, an indication that an association between the third image and the second image is invalid, responsive to the first image and the second image being associated.

The details of various embodiments of the invention are set forth in the accompanying drawings and the description below.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 3 is a block diagram illustrating an individual image database with example employees represented in the database, according to some implementations.

FIG. 4 is a block diagram illustrating an allocation database with example employees represented in the database, according to some implementations.

Figure 1:
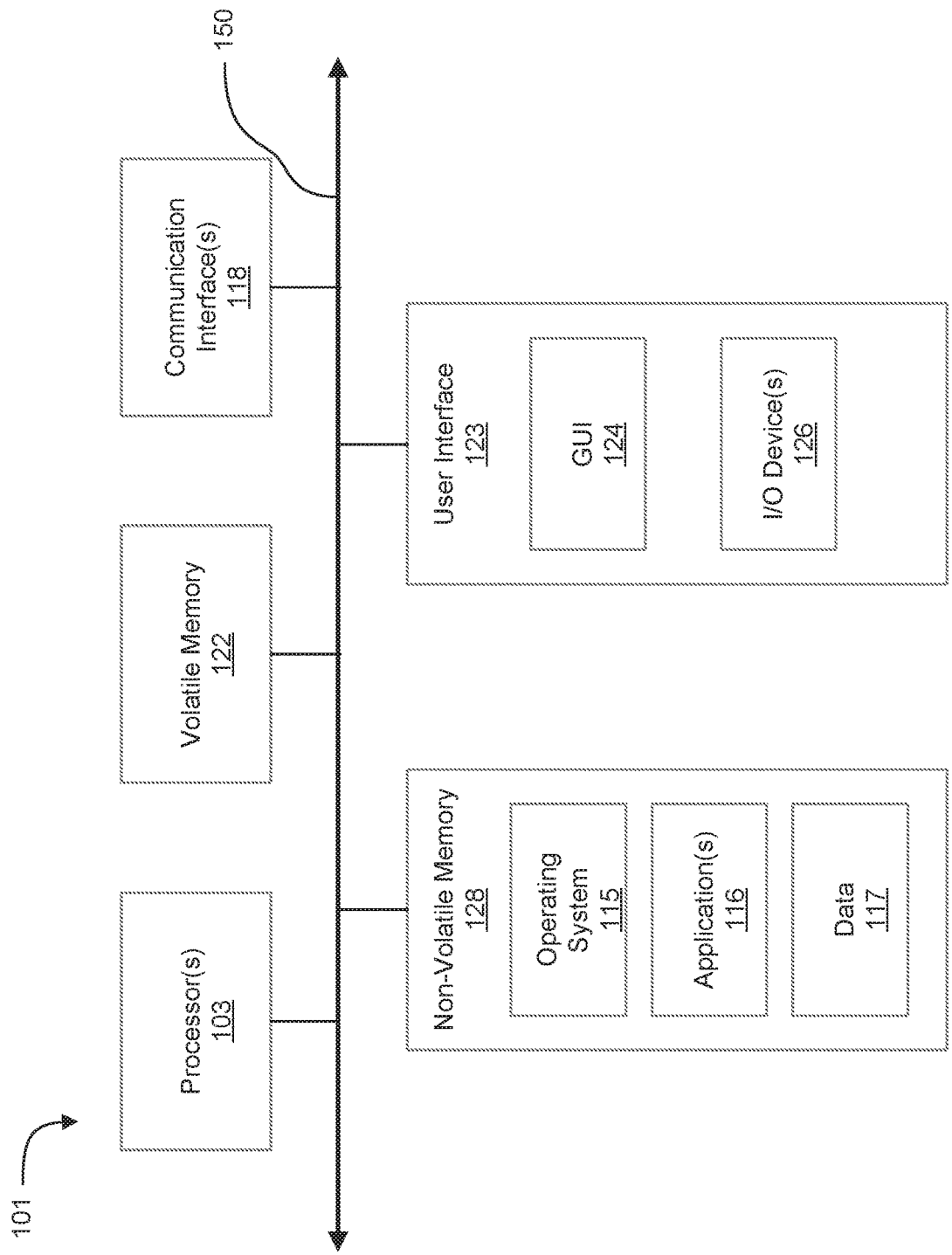
FIG. 1 is a block diagram illustrating an implementation of a network environment for use with the systems and methods discussed herein.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for updating a database based on object recognition.

A. Computing Environment

Prior to discussing the specifics of embodiments of the systems and methods of updating a database based on object recognition, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for Updating a Database Based on Object Recognition

Various data entry tasks required by enterprises from employees may be tedious, such as recording attendance at a meeting, tracking receipts for reimbursement, or other such data entry tasks. Though these tasks may be important to the enterprise, there is frequently low compliance from employees or users due to the effort required, frustration with data entry systems, or other such issues. Additionally, these systems may be prone to errors in data entry or even fraud, requiring extensive manual review.

In particular, object recognition techniques utilize a plurality of libraries and algorithms to determine what an object is and the characteristics of the object. In many implementations, devices that use object recognition techniques can identify who a person is or what words transcribed on a surface say based on a picture after a person uploads pictures to the devices. In some implementations, devices can update a database based on the objects recognized in a picture by associating the objects within the picture with a value also received by the device. However, these implementations generally do not provide for any method of determining whether the people or images depicted in the picture are who or what the person that uploaded the picture claims them to be or whether the person intended to upload the picture and/or value. Often, no attempts are made to determine if a picture and value association is valid or not or if a person has already been reimbursed for a meal because such attempts generally involve using object recognition to scan the picture and values looking for signs of fraud, which takes up valuable processing power. Consequently, databases are updated based on invalid associations and store invalid values.

Accordingly, to fix errors caused by updating databases caused by invalid associations, enterprises need to use a substantial amount of computing power to collect and analyze each association that impacted the database to determine which associations resulted from invalid associations. Thus, there is a need for the device to stop the problem at the source and determine whether a proposed association is valid and whether the association has already occurred before updating a database based on the association between a picture and a value or disbursing a reimbursement check.

An improved system for data entry may leverage cameras, along with facial recognition, object recognition, and optical character recognition technologies, as well as applying comparison rules to automatically detect erroneous or fraudulent entries. A system may receive one or more photos from a device associated with a user or individual, and may receive data values to be associated with objects or individuals (including potentially one or more additional users or individuals) identified in the photos (either via optical character recognition from one or more photos or via data values entered manually or received from another device). Values can be numeric representations of aspects associated with a picture such as, but not limited to, a number in a picture, a final total of a bill, a count of the number of items or people, a rating, a time frame, a distance, etc. The system may identify the individuals or objects based on a set of training data, such as an employee directory, and may associate the data values with the individuals or objects, either directly or proportionally based on the number of individuals or objects. Such associations of individuals, objects, and/or data values or portions of data values may be recorded in a database of the system for further tracking and analysis, as well as other uses by the enterprise (including marketing, accounts payable, or other such uses). Users need not manually identify the individuals or objects or associations with the data values, reducing end user effort and reducing non-compliance. Rules may be applied to each association of object, individual, and/or data value, as well as across multiple associations, to automatically detect erroneous or fraudulent entries.

Accordingly, the systems and methods discussed herein provide for object identification, by a device, of individuals and values in one or more pictures that allows the device to automatically determine whether an association between a picture and a value is valid and, if the association is valid, update a database based on the association between the picture and value. Pictures and values can be associated with each other if they are related in some manner. For example, a count of eight people in a picture of people in a boardroom meeting may produce a value of eight. The picture and value may be associated because the value is representative of the number of people in the picture. The device can update a database to show that eight people were present in the board room. If the device determines that the association is invalid, the device can return an error message to the user device that uploaded the picture and value or an administrative device instead of using processing power to identify objects in the picture and to update the database.

The device can determine the validity of an association between a picture and value by determining the location and time that a picture and a value were generated and comparing the location and time associated with the picture with the location and time associated with the value. If the respective locations or times are too far apart, the device can return an error message instead of updating the database. If the locations and times are not too far apart, the device can identify individuals in the picture and the value and update the database accordingly. Because the device can determine if associations are valid before identifying individuals and values, the device can save valuable processing time and resources by not using time and resources to identify individuals and values in invalid associations. Further, the device may not need to use resources to perform a second or additional scans of the pictures and values for indications of fraud because the device can catch invalid associations before performing any operations to update the database.

Embodiments of the method and system described herein may include, using a device, automatically populating and/or updating a database with new values by associating an image received from an image capture device with a value that could also be received from an image capture device or from another device. In some embodiments, the value that is received from an image capture device could be a user input including the value or a picture of the value. For example, the device could receive a picture of a plurality of individuals around a dinner table and a picture of a receipt representing the total cost of what each individual ate. The device could receive both pictures, identify the individuals in one picture and the total cost on the receipt as the value in the other picture, divide the total cost of the receipt by the number of individuals in the picture, and update a database to include the cost associated with each individual. To perform each of these operations, however, the device may determine that both pictures are valid and are meant to be associated to update the database.

For example, in many implementations, the device may be a management server configured to receive two pictures (one of the pictures potentially including a data value), determine and identify characteristics of each picture, associate the pictures with each other, and update a database based on the association. In one such implementation, one of the pictures may be a picture of a group of people and the other picture may be a picture a receipt for a meal that the group of people shared together. For example, a group of people including a supervisor and four employees of one company may go out to dinner. Each person's meal may be listed as an item on one bill. The group of people may then have a separate person not in the group take a picture of the group and a picture of the bill including the final total representing how much each person spent on their meal. The device taking the picture can then send the picture to the management server which can identify different characteristics associated with the pictures to determine the contents of the pictures. The management server may then determine that the two pictures are associated with each other and determine the people in the picture of the group that work for the company and their position within the company. Each person within the company can be assigned a different percentage based on their position. The management server can then take the total, assign a value to each employee (e.g. directly, or proportionally based on the percentage associated with their position or title, in some implementations), and update a database with the newly assigned values.

Characteristics that management server can assign to the pictures and/or values may include the location that the picture was taken, the time that the picture was taken, or the time that management server received the pictures. Each of these characteristics can be used to ensure that the values and pictures are appropriately assigned to each other, that a hostile third party cannot fraudulently update an employee's database, and that an employee cannot charge a company account more than once for the same meal. For example, the management server can determine that a value associated with a picture of a group is invalid if the picture of the group is taken in Madison, Wis. when the corporation is in Boston and there is no indication of a company trip outside of Boston, for manually entered data values; or similarly determine that the association is invalid if the data value is acquired via OCR of a photo of a receipt or other object, the photo taken in a location other than the Madison location at which the picture of the group was taken. A person within the group may be attempting to be reimbursed for a meal that is not related to work. In this example, the management server may stop the reimbursement process and send a message to a second device, such as a database or an administrative device associated with a company, indicating a value and picture were generated too far apart from each other.

Another example is when the picture and value were generated or uploaded at times or dates too far apart from each other. For example, a company policy may be that employees can only be reimbursed for meals if the receipt or other data is provided within two weeks of the meal. A picture may be taken of a group at a meal in January and a picture of the receipt may not be sent to the management server until March. The management server could receive these pictures and determine that the time associated with the group picture and the receipt are too far apart, consequently the receipt and group picture may not be associated and a warning may be sent to the image capture device that took the pictures and/or to a second device.

Figure 2:
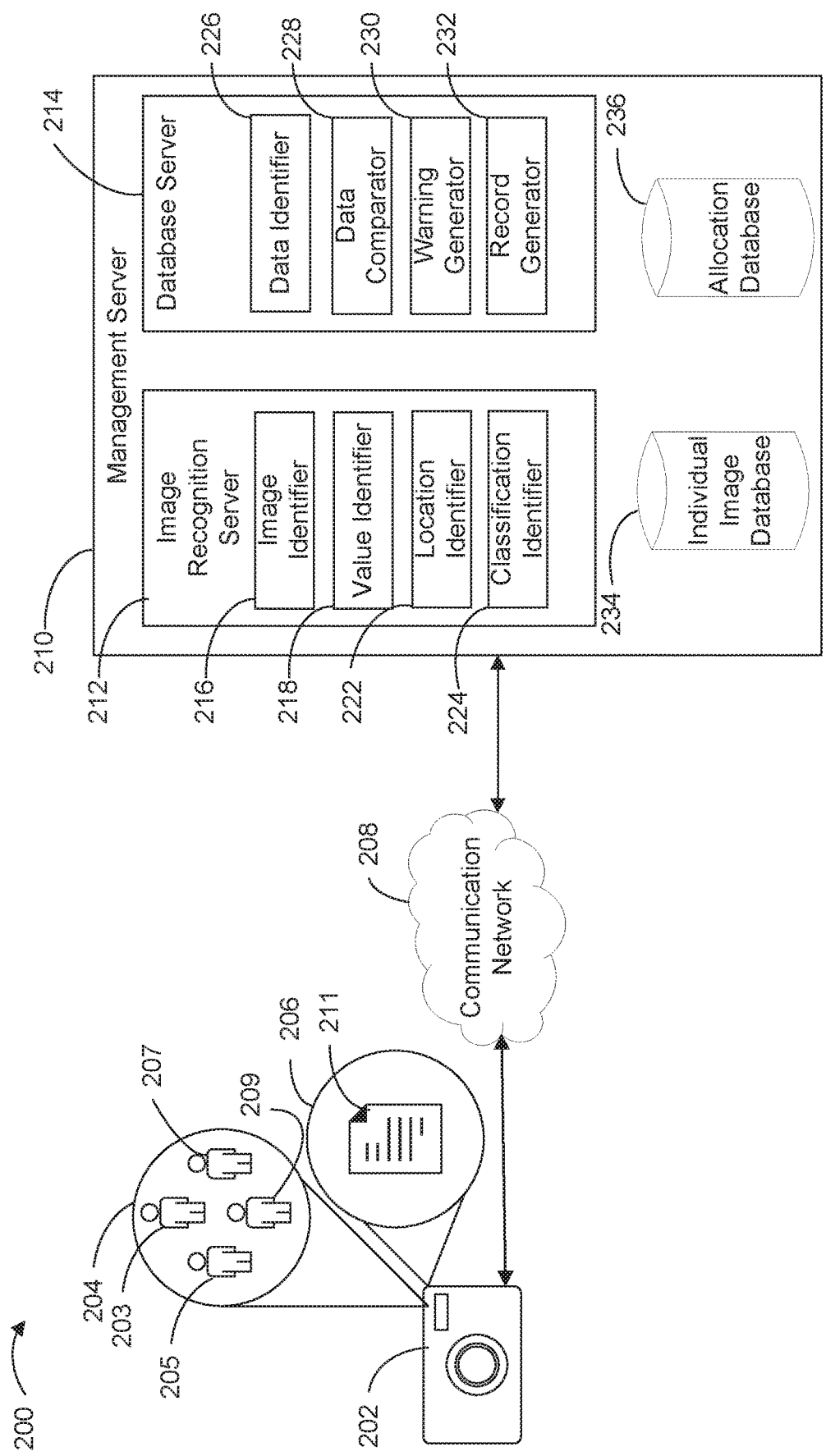
FIG. 2 is a block diagram illustrating an implementation of a management system including an image capture device and a management server connected through a communication network, according to some implementations.

FIG. 2 is a block diagram illustrating an implementation of a management system 200 which is shown to include an image capture device 202 and a management server 210 connected through a communication network 208. Management server 210 may include an image recognition server 212 and a database server 214. Each server 212 and 214 may include one or more processors. Management server 210 is also shown to include individual database 234 and allocation database 236 connected to management server 210. In other implementations (not shown), one or more of databases 234 and 236 may be provided by another device in communication with management server 210 and elements within management server 210 through communication network 208. Further, databases 234 and 236 may be components of management server 210 or subcomponents of the components within management server 210. Each of components 202, 208, 210, 212, 214, 234, and 236 of FIG. 1 may be implemented or associated with hardware components, software components, or firmware components or any combination of such components. The components 202, 208, 210, 212, 214, 234, and 236 can, for example, be implemented or associated with servers, software processes and engines, and/or various embedded systems.

Image capture device 202 may include any number of components configured to capture or generate pictures. In some embodiments, image capture device 202 may also capture or generate audio and videos. Accordingly, image capture device 202 may include a camera, a tape recorder, a smart phone, a tablet, a personal computer (e.g., a desktop computer), a mobile computing device, a cell phone, a head-mounted computing device, a media center, an artist, wearable device, and any other device or person capable of capturing or generating pictures. In some embodiments, image capture device 202 can take one or a plurality of pictures of its surroundings and transmit the pictures over communication network 208 to management server 210. Pictures 204 and 206 are examples of pictures that image capture device 202 can take.

In some embodiments, image capture device 202 may be configured to determine a time that a picture was taken and assign the time to the picture before transmitting the picture management server 210 through communication network 208. Image capture device 202 may determine the time that a picture was taken based on an internal clock (not shown) that is continuously running, such as an operating system clock. When image capture device 202 takes a picture, image capture device 202 may check the time of the internal clock and tag the picture with the time indicated by the internal clock at the time the picture was taken. In other implementations, image capture device 202 may receive a time, such as from a network time server, a GPS transmitter, a cellular transmitter, or any other such server. The picture may be tagged in metadata, such as EXIF data. In other implementations, the management server 210 may associate a time with the picture based on a time of receipt of the picture (e.g. based on a clock of the management server); this may be referred to as a receipt time rather than a capture time. A capture time may be the time that a picture is taken or any other time indicating when a picture was generated (e.g. a time of creation of a file storing the picture, a time of uploading the picture to cloud storage or another server, or any other such time associated with generation of the picture).

In some embodiments, a user of the image capture device 202 can manually input the time that the picture was taken and image capture device 202 can tag the picture with the user input. For example, a user could take a picture of a person or group of people in a restaurant at 8 o'clock pm with image capture device 202. Image capture device 202 may capture the picture and determine that it was taken at 8 o'clock based its internal clock or the user may input the time the picture was taken into the image capture device (e.g., using a touch screen display or input keys of the device 202). Once image capture device 202 captures the picture of the restaurant, image capture device 202 could tag the picture with a tag labelled "8 o'clock."

In other embodiments, image capture device 202 may determine the time based on characteristics within a picture. In some embodiments, image capture device 202 can determine an exact time while in other embodiment image capture device 202 can determine a range of times, such as morning, afternoon, night, a range of hours (e.g. 2:00 PM to 4:00 PM), etc. Characteristics may include, but are not limited to lighting of the picture, clocks showing the time in an area of the picture, or any other characteristic that could relate to the time of a picture. Image capture device 202 can scan the picture for characteristics and compare them to a database (not shown) to determine what time the picture was taken. For example, image capture device 202 may perform optical character recognition in a sliding window of the image to detect any numerals that may represent a time, such as from a clock in the background or foreground, and parse the OCR output for time (e.g. "(n)n:nn"). In other implementations, image capture device 202 may identify an analog clock within the background of an image (e.g. by identifying intersecting lines radiating from the center of a circle). In yet another implementation, if the picture includes a receipt having a time a purchase was made, image capture device 202 can determine the time stamp using OCR techniques on the receipt and finding the time. If image capture device 202 can match enough characteristics of the picture with characteristics within its database, image capture device 202 can determine and tag the picture with a time corresponding to when the picture was taken. If image capture device 202 cannot match enough characteristics of the picture with the database, image capture device 202 could generate an error message showing that a time could not be determined or a prompt to have the user input the time.

In another example, image capture device 202 can determine the time a picture was taken based on lighting characteristics of the picture. If a picture was taken outside, image capture device 202 can analyze the grayscale values of points around the pictures to determine how light it is outside. Image capture device 202 can compare the grayscale values with grayscale values in a database including grayscale values associated with times to determine an approximation of what time the picture was taken. In another implementation, geolocation services of the image capture device 202 (discussed in more detail below) may be used to identify a commercial location at which the picture was taken having limited hours (e.g. a restaurant's opening and closing times), which may be retrieved via a search engine lookup, and the picture may be associated with the range of time during which the location is open.

In some embodiments, image capture device 202 may also determine the location that a picture was taken and tag the picture with the location (e.g. in metadata or EXIF data), similar to how image capture device 202 tagged the picture with the time. Image capture device 202 may determine the location that the picture was taken by using a GPS system or another system related to determining the location of a person or device (e.g. cellular tower triangulation, IP address geolocation, etc.). When image capture device 202 takes a picture, image capture device 202 may send a request to a location service, such as a satellite, asking for the location of image capture device 202 at the time the picture was taken.

Once image capture device 202 receives a response including the location, image capture device 202 may tag the picture with the location included in the response. In some embodiments, the service that provided the location may also provide the time and date that the picture was generated. For example, time and date information may be received via GPS signals in many implementations. The image capture device 202 may associate the picture with the location, time, and date data received from the GPS or other location service when the picture was generated or captured.

In some embodiments, a user may manually tag the picture with the location the picture was taken by typing a string including the name of the location into image capture device 202. Once the user types the location into image capture device 202, image capture device 202 can tag the picture with the location. For example, if an image capture device 202 takes a picture while it is in an office building, image capture device 202 can determine the picture was taken in the office building with its location determination system and tag the picture with a descriptor describing the name of the location. A user may also manually input the name of the location the picture was taken and then image capture device 202 can tag the picture.

In some embodiments, image capture device 202 may determine the location based on characteristics within the picture. Characteristics may include, but are not limited to, the lighting of the picture, items in the picture, people in the picture, or any other object or characteristic in the picture that could relate to the location the picture was taken. Image capture device 202 can scan the picture for characteristics and compare them to characteristics in a database (not shown) to determine the location the picture was taken. If image capture device 202 can match enough characteristics of the picture with characteristics within its database, image capture device 202 could determine and tag the picture with a location corresponding to where the picture was taken. In some implementations, the number of characteristics necessary for image capture device 202 to determine the location can be determined by a user or administrator. The user or administrator can set a threshold number of characteristics, i.e. 5, or a confidence level, i.e. 80% where objects in the image match at least 80% percent of other images associated with a location that have been downloaded into image capture device 202.

For example, in one implementation, a photo may include a receipt, menu, or other article with text identifying a restaurant, which may be detected via OCR scanning of the image. In some implementations, this information may be used alone, or the image capture device 202 may combine the OCR data with partial geolocation data (e.g. identifying a general region). For example, image capture device 202 may transmit a request to a search engine for the location of the restaurant or other identified words within the region defined by the partial geolocation data. If image capture device 202 cannot match enough characteristics of the picture with the database, image capture device 202 could generate an error message showing that a location could not be determined.

In some embodiments, image capture device 202 can be a smartphone including payment applications such as Apple Pay and Google Pay which allow a user to pay for a bill at a restaurant or other commercial establishment using solely their phone. In these embodiments, the phone can act as a terminal and the user can scan image capture device 202 at a payment terminal within the restaurant to capture a QR code, barcode, or other visual information; or the phone or other device may receive payment information via near field communications (NFC), Bluetooth, or any other appropriate protocol from a point of sale terminal or other device. In some implementations, an application executed by a user's device may receive a pushed notification or receipt from the vendor after the transaction is completed, and the value, time, and/or location may be extracted from the received notification or receipt. In any of these embodiments, image capture device 202 may be able to determine a value, time, and location to associate with the picture of the group by using information received by the phone after it is scanned. The information may include a log including what was purchased, when it was purchased, and at what restaurant the purchase was made. From this data, the total cost of what was purchased can be the value, the location of the restaurant can be the location, and the time the purchase was made can be the time stamp. Image capture device 202 can associate this information with the value that is associated with a picture of the group of people taken at the restaurant.

In addition to determining and tagging pictures with tags describing the time and location that pictures are taken, image capture device 202 can also be configured to determine and tag a value that could be associated with pictures. In some embodiments, image capture device 202 can determine a value associated with the picture (e.g. number of similar objects in the picture, total price of a bill, etc.) to tag the picture with in a plurality of ways, such as, but not limited to, through a manual user input and by associating a second picture taken by image capture device 202 showing the value with the first picture. If a user manually inputs a value associated with the picture, image capture device 202 can tag the picture with the input value similarly to how it can tag the picture with the location and time the picture was taken.

For example, a user using image capture device 202 can take a picture of a group of people at a board room meeting. After taking the picture, image capture device 202 can determine the location, i.e. the board room, that the picture was taken along with the time the picture was taken. Image capture device 202 may then determine a value to associate with the picture, such as 8 for the number of people in the boardroom meeting. The user may input the value manually by typing the value into image capture device 202 or by taking a second picture and using object identification Image capture device 202 may determine the number of people present at the meeting and identify this number as the value to associate with the picture of the group of people. In some embodiments, image capture device may determine the number of people in the board room meeting by scanning the first picture and identifying each person.

In another example, image capture device 202 may determine the value to tag the first picture based on a second picture including a number, such as a picture of a receipt. Image capture device 202 can determine the value for the tag by scanning the second picture for images of a number that match an image of a number in a database (not shown). If image capture device 202 finds a picture of a number in the second picture that matches a picture of a number in the database, image capture device 202 could determine a value and tag the first picture with the value. If image capture device 202 cannot find a number that matches the value, then image capture device 202 could generate and display an error message.

For example, image capture device 202 may take a picture of a receipt at a restaurant. Image capture device 202 can scan the receipt for an image of the total cost of the receipt and then use the total cost as the value associated with the picture of the receipt. Image capture device 202 can determine what the total cost is by using object recognition software and comparing images within the receipt to images of numbers. If there is a match between images in the receipt and the images of numbers, image capture device 202 can use the value represented by the matched number as the value associated with the picture of the receipt and associate that value with the first picture.

In some embodiments, image capture device 202 may be unable to determine a number to tag the picture (e.g. due to lack of detection of a number or detection of too many numbers). Instead, image capture device 202 can take a first picture including a room and a second picture including a value and send both pictures to management server 210. Image capture device 202 can tag both pictures with the location, time, and date that they were taken before sending the pictures to management server 210.

In an example embodiment, image capture device 202 can take two pictures represented by elements 204 and 206. Picture 204 is shown to include four people 203, 205, 207, and 209 and picture 206 is shown to include a piece of paper 211 (e.g., a transaction receipt). The pictures can show any subject, environment, or object. In the example embodiment, image capture device can take picture 204 of four people 203-209 at a restaurant after they have eaten their meal. Image capture device 202 could determine and tag picture 204 with the location of the restaurant and the time picture 204 was taken based on internal systems in image capture device 202 or based on manual inputs. A user can then input a value into image capture device 202 associated with picture 204. The value can represent the total cost of the meal or be related to any other aspect of picture 204. Once the value is received by image capture device 202, image capture device 202 can either tag the picture with the value or transmit both the picture and the value to management server 210 along with tags describing the location and time the picture and value were respectively taken and received. In another embodiment, instead of receiving a manually input value from a user, image capture device 202 can take a picture 206 of receipt 211, tag picture 206 with the location and time picture 206 was taken, and transmit picture 206 along with picture 204 to management server 210.

Communication network 208 may include any element or system that facilitates communications among and between various network nodes, such as elements 202, 208, 210, 212, 214, 234, and 236. Communication network 208 may include one or more telecommunications networks, such as computer networks, telephone or other communications networks, the Internet, etc. The network 112 may include a shared, public, or private data network encompassing a wide area (e.g., WAN) or local area (e.g., LAN). In some implementations, communication network 208 may facilitate data exchange by way of packet switching using the Internet Protocol (IP). Network 208 may facilitate wired and/or wireless connectivity and communication.

Referring still to FIG. 2, management server 210 may be a processor configured to receive an image and value from image capture device 202, determine the contents of the image, classify individuals in the image, assign a value based on the classifications, generate a record, update a database, determine if a warning needs to be generated, and generate the warning. As described above, management server 210 may include image recognition server 212 and database server 214. Further, management server 210 can be configured to make and receive requests and responses from individual image database 234 and allocation database 236. One or a plurality of processors (not shown) within management server 210 can facilitate communication between each component within management server 210 and external components such as components 202, 208, 234, and 236. Any number of processors can facilitate such communication. Management server 210 may include multiple connected devices, with each device providing portions of the necessary operations (e.g., as a server bank, a group of blade servers, or a multi-processor system). In some embodiments, management server 210 may be transformed into a special-purpose microprocessor by executing computer-executable instructions or by otherwise being programmed.

Image recognition server 212 may be a processor configured to receive images and values sent over communication network 208 by image capture device 202 and identify different characteristics associated with the images and values. Image recognition server 212 can, in various implementations, identify the location a picture was taken, people in the picture, classifications of the people in the picture, and/or identify values associated with the picture. Image recognition server 212 can also identify the time and location a value was generated and/or received, in some implementations. Image recognition server 212 is shown to include an image identifier 216, a value identifier 218, a location identifier 222, and a classification identifier 224. Image recognition server 212 may also include processors or other components dedicated to allowing each of components 216-224 to interface with each other and with components external to image recognition server 212, such as database server 214.

Location identifier 222 may be one or a plurality of processors configured to receive a picture from image capture device 202 and to identify the location at which the picture was generated by image capture device 202 along with the time stamp associated with the time the picture was taken or when management server 210 received the picture. Location identifier 222 can identify the time stamp by, in some implementations, scanning the picture that image capture device 202 sent to management server 210 for a time stamp tag and match a string within location identifier 222 with a string including the time stamp. In another embodiment, location identifier 222 may identify the time stamp by identifying the time that management server 210 received the picture from image capture device 202.

Location identifier 222 can determine the location or approximate location at which a picture was generated. As described above, in some embodiments, image capture device 202 sends the picture with GPS or other geolocation data to location identifier 222. In some implementations, location identifier 222 can receive the data indicating the location that the picture was taken and identify the location by comparing the metadata describing the location with information in individual image database 234. If the location is described in individual image database 234, then in some implementations, location identifier 222 can tag the picture and/or value with the location from individual image database 234. If the location is not in individual image database 234, location identifier 222 can send an error message back to image capture device 202 or a second device showing that the location could not be found. Individual image database 234 can be populated in real time as people take pictures of locations and manually tag each picture with the location they are in or prepopulated with a plurality of pictures tagged with the environment's location.

In some embodiments, if the location at which image capture device 202 captured the picture or received the value is not in individual image database 234, location identifier 222 can write the new location into individual image database 234 and tag the picture with the location. Location identifier 222 can write in the GPS or geolocation data that image capture device 202 generated and received when it took the picture. If there is no GPS data or data indicating where location image capture device 202 was when capturing the picture, location identifier 222 can send an error to image capture device 202 indicating the picture needs location data and the image cannot be processed or send an message to a second device indicating management server 210 received a picture from image capture device 202 without location data.

In some embodiments, location identifier 222 can determine the location a picture was taken by analyzing objects and characteristics within the picture and comparing them to images, eigenvalues, and hash values of pictures within individual image database 234. For example, image database 234 may have images, eigenvalues, and hash values related to images in a restaurant or grocery store. Location identifier 222 can receive a picture and scan the picture for objects and characteristics using object recognition libraries such as Tensorflow object detection API, mask R-CNN, RetinaNet, Faster R-CNN, RPN, Fast R-CNN, and R-FCN, etc., and optical character recognition libraries such as Microsoft cognitive services, Google cloud vision, AWS recognition, etc. If location identifier 222 finds enough similarities to reach a user selected threshold, location identifier 222 can determine the location the picture was taken. Further, if the eigenvalue and/or hash value of the picture taken by image capture device 202 match or is in a user selected range of eigenvalues and/or hash values within individual image database 234, location identifier 222 can determine the picture was taken at the location with the matched eigenvalue or hash value.

Referring still to FIG. 2, value identifier 218 may be a processor or a plurality of processors configured to receive and identify a value and associate, or tag, a picture sent from image capture device 202 with the value. Value identifier 218 can receive and identify the value in a plurality of ways, such as, but not limited to, receiving the value as a user input separately from the picture from image capture device 202, receiving the value as a tagged characteristic of the picture from image capture device 202, and receiving a second picture including the value.

Value identifier 218 may determine a time stamp associated with the value. For example, in some embodiments, if the user manually inputs the value at image capture device 202, image capture device 202 can create a time stamp associated with the value and send the time stamp to value identifier 218 with the value. Value identifier 218 can then identify the time stamp and associate the time stamp with the value by scanning the value or picture and the information received from image capture device 202 for the time stamp, or via any of the implementations discussed above. In another embodiment, a user input value can be sent to value identifier 218 without image capture device 202 creating a time stamp. Value identifier 218 can generate a time stamp based on when value identifier 218 received the value or based on meta data about the time the value was generated at image capture device 202. The meta data may include any information associated with image capture device 202, such as battery life of image capture device 202 when it received the value, length of time the image capture device 202 has been on when it received the value, or any other pieces of data associated with image capture device. Value identifier 218 can tag the value with the time stamp after generating the time stamp.

In some embodiments, if value identifier 218 receives the value as a user input separately from a picture, value identifier 218 can associate the value with the picture based on one or more metrics. In some embodiments, as described below, value identifier 218 can identify time stamps associated with both the picture and the value. If the time stamps are at times within a user- or administrator-specified time frame, value identifier 218 can identify the value and associate the value with the picture. If the time stamps are at times outside of the user- or administrator-selected time frame, value identifier 218 can send an error message back to image capture device 202 or a second device stating that the value could not be matched with the photo. For example, value identifier 218 can receive a picture of a group of people at a restaurant at 6:57 PM. If the user selected range is one hour and value identifier receives a value at 10:00 PM, in some implementations, the value identifier 218 can send back an error to image capture device 202 indicating value identifier 218 received the value too late. If the time stamp of the value is 7:27 PM, however, in some implementations, value identifier 218 can identify the value and associate the value with the picture. In some embodiments, value identifier 218 can send an error message back to image capture device 202 or the second device indicating an error when the time stamps are within the user- or administrator-selected range.

In some embodiments, a user can manually associate a photo with a user input value. The user can select a photo, from a graphical user interface on image capture device 202 or any other device and from a menu full of photos on the graphical user interface, and type a value into the user interface indicating that the value is associated with the photo.

In some embodiments, if image capture device 202 tags pictures with values and time stamps before sending the pictures to value identifier 218, value identifier 218 can scan the picture for tags and determine that the picture has already been tagged. For example, image capture device 202 may capture a picture, receive a user input value, create a time stamp for the value, and send the picture with one or more tags (indicating the value and time stamp information) to value identifier 218. Value identifier 218 can receive the tagged picture, scan the picture for tags, and determine that no more computations need to be conducted to tag the picture with a value and/or timestamp.

In some embodiments, value identifier 218 may tag a first picture with a value after image capture device 202 transmits the first picture and a second picture to value identifier 218. The second picture may be associated with a value and the first picture. For example, image capture device 202 may transmit a first picture of a group of people at a restaurant and a second picture of a receipt describing what each person ate and the total cost of the meal. Value identifier 218 can determine that the second picture is associated with the first picture based on time stamps, a user input into a graphical user interface, or any other method used to associate a first picture with a second picture. Value identifier 218 can then determine the value based on the picture of the receipt and tag the first picture with the value. Value identifier 218 can determine a time stamp associated with the second picture in a manner similar to how value identifier 218 determines time stamps for other pictures.

In some embodiments, to determine the value associated with a second picture including a receipt, value identifier 218 can use optical character recognition algorithms to parse through the picture and determine the receipt's final total. Example libraries that can be used by the value identifier 218 to determine the value from a picture include, but are not limited to, Microsoft cognitive services, Google cloud vision, AWS recognition, etc. Value identifier 218 can parse through the second picture, detect the text within the picture, analyze the text looking for key words associated with the receipts final total, and determine the final value of the receipt. The final value of the receipt can be the total cost of a meal after aggregating the cost of each individual's foods and beverages. To determine the final value of the receipt, value identifier 218 can look for key words such as, but not limited to, "Total," "VISA Charge," "After Tax," "Total so far," "Amt. Due," "Balance Due," etc. After determining the final value of the receipt, value identifier 218 can determine the final value is the value associated with the second picture including the receipt and tag the first picture with a tag including the value.

In some embodiments, value identifier 218 may determine a value associated with the second picture by scanning the second picture for a number. The number does not necessarily need to be associated with a receipt, but rather can be other numbers such as a street address number, a score of a sporting event, a license plate number, or any other number. In some embodiments, the value may be associated with the number of objects of a certain type that are in a picture. For example, if a picture includes five items in a shopping cart, value identifier 218 could determine that the value associated with the picture is five.

In some embodiments, image capture device 202 may send a picture of a receipt before a picture of a group of people. Image capture device 202 can determine if the picture of the receipt is associated with the picture of the group of people by scanning the picture of the receipt looking for values and people, determining that there is a final value in the picture of the receipt, scanning the second picture for pictures of people, determining there are pictures of people, and then tagging the second picture with the value determined from the picture of the receipt. Value identifier 218 can determine if the pictures are associated by using time stamps or a user input at a graphical user interface.

In some embodiments, after determining a time stamp is associated with a value, value identifier 218 can send the time stamps associated with the value and the time stamp associated with a picture to a data comparator 228 within database server 214. Data comparator 228 may include one or more processors configured to receive data and compare the data to a threshold before determining whether a warning needs to be generated or associating two images to one another. For example, data comparator 228 can receive the time stamps associated with the value and the picture from value identifier 218 and determine if the time stamps are too far apart (e.g. above a threshold time interval). If the time stamps are too far apart (e.g. above the threshold time interval), in some implementations, data comparator 228 can send a signal to a warning generator 230, which may be a component of database server 214, indicating that warning generator 230 should generate a warning and transmit the warning to a second device or back to image capture device 202. In some embodiments, data comparator 228 can send the signal to warning generator 230 even if the time stamps are not too far apart (e.g. below a first threshold time interval, but greater than a second, lower threshold time interval).

In some embodiments, data comparator 228 can determine if the time stamps are too far apart by calculating the difference in time between the two time stamps and determining whether the difference is above a threshold. The threshold can be user or administrator created or automatically created by data comparator 228 using an average of past thresholds. If the difference is above a threshold, then data comparator 228 can send a signal to warning generator 230 indicating that the difference in time is too far apart. If the difference in time is below the threshold, however, data comparator 228 can send a signal to location identifier 222 that location identifier 222 can identify the locations associated with the picture and the value. If the time stamps are too far apart (e.g. having a difference greater than a threshold), data comparator may not associate the picture with the value. In some embodiments, data comparator 228 can send a signal to warning generator 230 even if the difference in time is below the user selected threshold. This warning may be useful if the warning is generated at a time really close to the user selected threshold so the user that input the picture or value is aware to generate the pictures and/or time stamps sooner. In these embodiments, the image and value may still be associated with each other.

In some embodiments, warning generator 230 may include one or more of a plurality of processors configured to receive signals from components, generate warnings, and transmit the warnings to other devices. Warning generator 230 may generate the warnings after receiving a signal from data comparator 228 indicating that the time associated with a value and a picture are too far apart. Warning generator 230 may configure each warning to include a description of why the warning is being sent. For example, if the time stamps between the value and picture are too far apart, warning generator 230 could generate and transmit a warning to another device describing that an attempt was made to associate a value with a picture too long after the picture was taken. In this instance the value and picture may not be associated with each other.

For example, image capture device 202 may take a picture at a restaurant at 4 PM, and take a picture of a receipt received at the restaurant at 8 PM, tag both pictures with the time the pictures were taken, and send the pictures to management server 210. Value identifier 218 and location identifier 222 can identify the picture and value and the time stamps associated with the picture and value. If the policy set at management server 210 is to only allow pictures to be associated with within a time threshold of one hour, data comparator 228 can determine the value was received too late after the picture was generated and send a signal to warning generator 230 instead of associating the picture with the value. Warning generator 230 can generate a signal indicating that the value was generated too late after the picture and send a warning to a second device. In other implementations, such as where a time value may be extracted from the receipt via OCR or received via other means (e.g. push notification to a user's device), this extracted or received value may be used instead of a time at which a picture of the receipt was taken for the purpose of the above comparisons.

Once location identifier 222 receives a signal from data comparator 228 indicating that the time stamps are not too far apart, location identifier 222 can identify the location associated with the value. Location identifier 222 can identify the locations associated with values in a similar manner to how location identifier 222 determines the locations of pictures. Location identifier 222 can use meta data, such as GPS data and data associated image capture device 202, associated with the value sent from image capture device 202 to tag the value with the location it was generated. Further, if the value is captured in a picture, location identifier 222 can identify different characteristics within the picture and compare the characteristics to characteristics in individual image database 234. If there are enough similar characteristics to reach a user created threshold of similar characteristics, location identifier 222 can determine the location that is associated with the value and tag the value accordingly. After tagging the value, location identifier 222 can send the tagged value to data comparator 228 along with the tagged picture.

An example of using similar characteristics to determine a location that a picture associated with a value is taken may be using characteristics of a meeting room in a picture to determine a meeting occurred in a meeting room. A user such as an administrator running management server 210 may have fed pictures of the meeting room into location identifier 222 and indicated that each picture is a picture of the meeting room. Location identifier 222 can compare characteristics of the picture associated with the value with these pictures and determine if enough characteristics in the present picture match characteristics of the other pictures. If enough characteristics match the user selected threshold, the location identifier 222 can determine the meeting took place in a specific meeting room. If some characteristics match but not enough to meet the threshold, location identifier 222 cannot determine where the meeting took place and may have to rely on other characteristics of the picture to determine the location of the meeting.

After receiving the value and picture that have both been tagged with the location they were generated, data comparator 228 may be configured to identify whether the locations associated with the tags are too far apart. If data comparator 228 determines that the tags indicate locations that are too far apart, data comparator 228 can send a signal to warning generator 230 indicating that the location where the value was generated was too far away from the location that the picture was generated. The signal may also indicate that warning generator 230 should generate a warning.

In some embodiments, data comparator 228 can determine if the locations indicated by the received pictures are too far apart by calculating the distance between the two locations indicated by the images and determining whether the distance is above a user selected threshold. The user selected threshold can be any distance between the locations the locations the pictures were generated that the user deems too far to create a valid association. The threshold can be user created or automatically created by data comparator 228 using an average of past thresholds. If the distance is above a threshold (e.g., a radius of 2 miles, 5 miles, 10 miles etc.), then data comparator 228 can send a signal to warning generator 230 indicating that the distance is too high. Once warning generator 230 receives the signal, warning generator 230 can send a warning message to a second device similar to the warning message it could send if the value was generated too long after the picture. If the difference is below the threshold, however, data comparator 228 can send a signal to image identifier 216 indicating that image identifier 216 can identify individuals in the picture. In some embodiments, data comparator 228 can send a signal to warning generator 230 even if the difference is below a threshold.

An example of when data comparator 228 can send a warning signal even if the difference is below a threshold is when a user creates a second threshold that is lower than the first threshold and the difference is between the two thresholds. If the difference is above the second threshold, a warning may be generated by management server 210 in addition to every other process conducted by management server. If the difference is above both thresholds, a warning may be generated and transmitted and management server 210 stops processing the picture and value. value. The warning that management server 210 generates in this scenario may be to let the user know to upload the picture and value at distances closer to each other.

To avoid false positives where a user could take a picture of the group at a meal at one location and then take a picture and submit a receipt at another location that the user travels to, a user may create a large distance threshold that encompasses common distances traveled between locations, i.e. a restaurant and an office space within a city or state. For example, the distance threshold may cover the entire state of Massachusetts. A user could eat a meal in Springfield, Mass., take a picture at the restaurant in Springfield, and then travel to the user's office in Boston and take a picture and submit the receipt. Because the distance threshold encompasses the area of Massachusetts, pictures of the receipt and group may be processed.

In some embodiments, data comparator 228 can determine the location of data comparator 228 or management server 210 and determine the distance between data comparator 228 or management server 210 and the location the value was captured. If the distance is above a user selected threshold, data comparator 228 can send a signal to warning generator 230 indicating that the distance is above the threshold. For example, a company may be local to the Boston area with every employee living in the Boston area and not much opportunity for company travel. Consequently, an administrator may set a distance threshold for any reimbursements generated by management server 210 to include only the Boston area. If a reimbursement request is received from an employee in California, management server 210 could determine that the reimbursement could not be for company reasons because the distance is above the threshold.

Image identifier 216 may be a processor configured to identify individuals in a picture by receiving the image and by using object recognition to find individuals in the picture that are also in individual image database 234. Image identifier 216 may use object detection libraries such as, but not limited to, Google's Tensorflow object detection API, mask R-CNN, RetinaNet, Faster R-CNN, RPN, Fast R-CNN, and R-FCN to identify that there are people in the picture. Image identifier 216 can then generate images of each individual in the picture and compare the images of each individual with images of individuals in individual image database 234. If image identifier 216 determines that an individual's image matches an individual's image in individual image database 234, image identifier 216 can determine the name of the individual along with other characteristics about the individual that are in individual image database 234. In some embodiments, image identifier 216 can determine the identity of each individual in a picture, regardless of the number of individuals. Once each individual is identified, image identifier 216 can generate a list of each individual and the characteristics associated with the individual and send the list to classification identifier 224 to identify which group each individual is in. Example characteristics of an individual could include the individual's position within a company, gender, age, height, or any other characteristic that can be associated with an individual. If an individual is located in the picture but image identifier 216 cannot find a matching image in individual image database 234, image identifier 216 can exclude the unrecognized image from the list.

For example, image identifier 216 may receive a picture including four people from a company that are about to eat, currently eating, or just ate dinner or another meal from image capture device 202. A fifth person that is unaffiliated with the company could be in the corner of the picture. Image identifier 216 can scan the picture looking for images and identify that there are five people in the picture along with their locations within the picture. Image identifier 216 can then generate a picture of each person and compare each picture to pictures in individual image database 234. Image identifier 216 may determine that the images of the four people match images in individual image database 234 and generate a list including each individual and characteristics associated with each individual. Image identifier 216 may also determine that the image of the fifth individual does not match an image in individual image database 234. Consequently, image identifier 216 may exclude the fifth individual from the generated list.

In some embodiments, instead of doing a direct image to image comparison between images in the picture and images in individual image database 234, image identifier 216 can generate an eigenvalue for each individual in the picture and compare it to eigenvalues in individual image database 234. Eigenvalues in individual image database 234 can be determined by inputting eigenvectors for each individual person into individual image database 234 and determining the eigenvalue based on the eigenvectors. Image identifier 216 can compare the eigenvalues associated with the individuals in the picture to eigenvalues in individual image database 234 and determine if there are any matches between the eigenvalues or any eigenvalues that are within a user selected range with each other. The user selected range can be any number, although a smaller range creates a greater degree of accuracy of identifying individuals in a picture. If the eigenvalue of the image of a person in the picture matches or is in a user specified range with the eigenvalue of an individual in individual image database 234, image identifier 216 can add the person to the list. If there is not a match, image identifier 216 can exclude the person from the list.

In some embodiments, similar to using eigenvalues, image identifier 216 can match images of individuals in a picture with images of individuals in individual image database 234 by comparing the hash values or eigenvalues of the image of each individual in the picture with hash values or eigenvalues of individuals in individual image database 234 (sometimes referred to as eigenfaces). Each individual in individual image database 234 can have a hash value associated with their image. Such hash values may be precomputed, in many implementations, or computed by analyzing the bits of the picture that show each individual. For example, in some implementations, a device may perform a principal component analysis on an image to detect potential facial features (e.g. symmetric portions, portions with high contrast, etc.). The resulting values may be compared to one or more vectors representing an average face (obtained from averaging training data of faces) to generate one or more difference vectors that may represent the individual's face. These average vectors may be precomputed in some implementations and provided to client devices, allowing the client devices to perform the comparison locally to generate a vector or hash value representative of the individual in the image. In other implementations, the client device may generate a hash value or vectors representing images of individuals identified in the image (again, from principal component analysis or identification of symmetric features), and the generated value or vectors may be provided to a server for comparison to values or vectors generated from training data (e.g. a user database or employee database, or other such source of facial images). If the hash value of the image of a person in the picture matches or is in a user specified range with a hash value of an individual in individual image database 234, image identifier 216 can add the person to the list. If there is not a match, image identifier 216 can exclude the person from the list.

In an example embodiment, individual image database 234 may include a database that includes entries with information about different people. For example, as will be described with reference to FIG. 3, individual image database 234 may include information about different employees in a company. Individual image database 234 may include information about each employee such as their name, position within the company, image, eigenvalue, hash value, and any other description that can be associated with employees in a company. Individual image database 234 may be divided into a plurality of sections representing the different characteristics of a person. In some embodiments, individual image database 234 can also include images, eigenvalues, and hash values associated with picture of different areas. For example, individual image database 234 may include one or more of a plurality of pictures of different restaurants or other vendors around the area of a business. Each vendor can have a plurality of eigenvalues, images, and hash values associated with images of the vendor's location in the database. Sections within database 234 may be interconnected to perform the functions described herein.

Classification identifier 224 may be a processor or a plurality of processors configured to determine a class of each individual that has been identified in a picture. Classes may be groups of individuals with similar characteristics, such as lower level employees, supervisors, managers, men, woman, people with red hair, people with blonde hair, etc. Classification identifier 224 can make this determination by retrieving information of each identified individual from individual image database 234. The information that classification identifier 224 retrieves can include a classification of each person based on their position within a company. For example, if classification identifier 224 is retrieving data from a picture including people within a company, classification identifier 224 can retrieve each identified person's name along with their position within the company individual image database 234. Examples of different positions include, but are not limited to, employee, supervisor, executive, CEO, CFO, etc. After retrieving the identified people and their classifications, classification identifier 224 can associate each employee with their respective classification.

Once components 216-224 receive a picture and value, tag the picture and value with location and time stamp data or identify such tags, identify people in the picture, and classify each person in the picture with classifications, image recognition server 212 can generate and transmit this data to database server 214. If image recognition server 212 or components 216-224 encounter any errors in performing these tasks, image recognition server 212 or the component that encounters the error may send an error message back to image capture device 202 or to a second device (e.g., a mobile computing device) indicating the error. In some embodiments, the error message may indicate a description of what caused the error.

Database server 214 may be one or a plurality of processors configured to receive the tagged pictures and values as data from image recognition server 212 and generate an output based on the tagged pictures and values. Database server 214 is shown to include a data identifier 226, data comparator 228, warning generator 230, and a record generator 232. Database server 214 may also include processors or other components configured to allow components 226-232 to interface with each other and with components external to database server 214, such as image recognition server 212.

Data identifier 226 may include one or a plurality of processors configured to receive identified individuals and values as data and identify the individuals in an allocation database 236. After receiving the identified individuals and values from server 212, data identifier 226 can search allocation database 236 to determine if the individuals have data associated with them in allocation database 236. If data about an identified individual is not in allocation database 236, data identifier 226 can cause warning generator 230 to send an error message to a second device or back to image capture device 202. Allocation database 236 is further described with reference to FIG. 4. If data identifier 226 finds a match between the data sent from image recognition server 212 and data in allocation database 236, data identifier 226 can send a signal to data comparator 228 indicating that the data is valid along with a list of the individuals, their classifications within allocation database 236 and individual image database 234, and the value.

Data comparator 228 can be configured to receive a signal indicating that the data is valid along with the list of individuals and values and determine how to divide the values. Data comparator 228 can assign the values based on the classifications of the identified individuals. For example, if each identified individual has the same classification, data comparator 228 can divide the value evenly and associate each portion of the value with each identified individual. In other implementations, an individual may be associated with a proportional value, and the value may be assigned to the individual (as well as other individuals) according to the proportions. For example, in one implementation, a user with a first classification associated with a proportional value of 50%. 50% of the value may be assigned to the individual, with the remaining 50% divided among remaining individuals in the list. In some further implementations, these proportional values may be applied hierarchically: a first individual with a first classification at a first node of the hierarchy may be assigned a proportional value of the total; a second individual with a second classification at a second node of the hierarchy that is a child of the first node may be assigned a proportional value of the total remaining after assignment to the first individual; etc. For example, given a first individual with a classification associated with a proportional value of 50% at a first node, a second individual with a classification associated with a proportional value of 50% at a second node that is a child of the first node; and a group of individuals with classifications associated with a third node that is a child of the second node (which may be non-proportional, or may be 1/n individuals in proportion), the first individual may be assigned 50% of the total value, the second individual may be assigned 25% of the total value (50% of the remaining 50%), and the group of individuals may be assigned equal shares of the remaining 25%. After allocating the portions of the value to each identified individual, data comparator 228 can send a signal to record generator 232 indicating the allocated portions.

In some embodiments, data comparator 228 can assign the values even if data comparator 228 receives a signal indicating that the data is invalid. In some embodiments, data comparator 228 can also assign the values even if the value was received or generated at a time or distance above a respective time and/or distance threshold. Data comparator 228 may assign the values if a difference in time stamps or the distance is above one time and/or distance threshold and below another. In these instances, a warning may be sent to a user device or second device, but data comparator 228 can still assign the values. This may be done to avoid false positives or identifying data as invalid when it is not actually invalid (e.g. if a user provides valid data, but at a time or location beyond the threshold). In some such implementations, a first threshold may be used to indicate a potential warning for further review of the data, while a second threshold may be used to indicate that the data is invalid (e.g. a first threshold of one week from image generation, and a second threshold of two weeks from image generation). In other such implementations, a validity score may be generated based on the differences in time and/or distance, with the score decreasing (or an invalidity score increasing) proportionally to the difference. Scored data may be provided for review in order of priority according to the score, allowing manual or automated review to be done efficiently on the values most likely to be invalid.

In some embodiments, one or more of the identified individuals can have a different classification than the other individuals. For example, a supervisor may be in a picture with a bunch of employees. In this scenario, instead of dividing the value evenly, the supervisor may be associated with a higher portion of the value than the employees. For example, if the value is 100 and there are three employees and one supervisor, the supervisor may be associated with a value of 40 while each employee may be associated with a value of 20. The supervisor and employees may be associated with any portion of any number. Further there may be any number of classes. Each class may be associated with a different portion of the value. As discussed above, such portions may be directly associated with the class (e.g. 1/n individuals, 2/n individuals, etc.) or may be hierarchical with portions associated with higher node classifications assigned first. Once the value has been divided into portions and allocated to each identified individual, data comparator 228 can send a signal to record generator 232 indicating the allocated portions.

In some embodiments, record generator 232 may include a processor or a plurality of processors configured to generate records and transmit the records to a second device or allocation database 236. In some embodiments, the second device may be an administrative device of a company, a third party server, a user device, etc. Records may be transmitted to the second device or allocation database 236 for archival, integration with financial programs (e.g. reimbursement systems, accounts payable systems, etc.), or further analysis (e.g. collection of identified individuals present at an event for later follow-up contact, analysis of what events led to further contacts, etc.). In some embodiments, the second device and allocation database 236 are the same component. Once record generator 232 receives the signal, record generator 232 can generate a record based on the value allocations to each individual and transmit the record to allocation database 236. As will be described with reference to FIG. 4, in some embodiments, record generator 232 can update allocation database 236 with new values based on the allocated values. For example, the allocated values may represent a proportional cost incurred by each individual for an event (e.g. meeting, lunch, etc.), and may be provided to allocation database 236 to be deducted from individual budgets, reimbursed via accounts payable systems, etc.

In an example embodiment, allocation database 236 may include a database that includes entries with information about different people. For example, as will be described with reference to FIG. 4, allocation database 236 may include information about different employees in a company and each employees spending using company funds. Allocation database 236 may include information about each employee such as their name, position within the company, the amount of company funds each employee has spent so far, how much money each employee can spend, how much money each employee has left to spend of the company budget, and any other description that can be associated with employees in a company and their company spending. Allocation database 236 may be divided into a plurality of sections or partitions representing the different characteristics of a person and their company spending. These sections within allocation database 236 may be interconnected to perform the functions described herein.

In some embodiments, management server 210 may receive a second or third image, depending on if a value was sent via a picture, after receiving a first picture and value. Management server 210 may receive the second or third image if a user accidentally uploads the same image again or if someone tries to get reimbursed for the same payment twice. Management server 210 may receive the second or third image at any time. Once management server 210 receives the second or third image, data comparator 228 can determine if the first image has been associated with the value. If data comparator 228 can determine that the first image has been associated with the value, data comparator 228 can send a signal to warning generator 230 indicating that warning generator 230 can send a message to a second device indicating that a second or third image had been received by management server 210 after the first picture had been identified with the value. If data comparator 228 can determine that the first picture was not associated with the first value, however, data comparator 228 can send a signal to location identifier 222 indicating that location identifier 222 can identify the time and location of the second or third image.

In one implementation of an example embodiment, image capture device 202 can capture a picture of items in a physical shopping cart. Image capture device 202 can then send the picture to management server 210 through network 208. Management server 210 can receive the picture, identify each object within the shopping cart from individual image database 234, and determine a value associated with each item in the shopping cart. Management server 210 can determine the value of each item in the shopping cart by using object recognition to identify each object within a database within management server 210 including objects and the cost of each object, by identifying barcodes or QR codes or UPC codes visible in the image, etc. Once management server identifies each object, management server 210 can retrieve the cost of each object as the value. Management server 210 can then aggregate the values associated with each item to obtain a final value and transmit a final value to a second device such as a database or a credit card company. The database or credit card company can assign a value to an account associated with the user that took the picture of the items in the shopping cart. In some embodiments, management server 210 can determine which shopping center or grocery store the shopping cart is in based on location data associated with the picture. In some embodiments, management server 210 can also determine the time and date the picture was taken.

In one implementation of an example embodiment, image capture device 202 can capture a picture of a group of individuals present at a meeting. In this implementation, image capture device 202 can capture the picture and send the picture to management server 210. Management server 210 can receive the picture and identify each person present at the meeting by identifying each person from individual image database 234. In some embodiments, management server 210 can determine who is not in the meeting based on a roster including a list of people that should be at the meeting uploaded from image device 202, uploaded from a second device, already present in individual image database, or in a database already in management server 210. After determining who is present at the meeting, management server 210 can update a second database, such as allocation database 236, indicating who was present at the meeting. A similar process can be used to determine who attended a sporting event or concert and how many people attended these events. In some embodiments, management server 210 can determine which conference room and business the meeting is in based on location data associated with the picture. In some embodiments, management server 210 can also determine the time and date the picture was taken.

Referring now to FIG. 3, a block diagram of an example table 235 associated with individual image database 234 is shown, according to some embodiments. Individual image database 234 may include lists of example people 302, classifications 304, eigenvalues 306, images 308, and hash values 310. Although not shown, individual image database 234 may also include images, eigenvalues, and hash values associated with geographic locations and areas. In some embodiments, individual image database 234 may be associated with a company, organization, or other sort of group and each row in individual image database 234 may be associated with an individual employee. Individual image database 234 can be associated with any group, such as ticket holders, event attendees, meeting attendees, etc. Individual image database 234 may be dynamic so people can be added or removed at any time. Further, each column may not be filled out for each person.

List of example people 302 may include any number of people with any number of names. Each person may be associated with a classification as shown in classifications list 304. Although only supervisor and employee classifications are shown, classifications can show any number of different classifications associated with any position or group.

Each person in the list of example people 302 may also be associated with an eigenvalue in eigenvalue list 306, an image in image list 308, and a hash value in hash value list 310. Each of the eigenvalue, the image, and the hash value can be used to determine the identity of a person in a picture.

List of images 308 may include images of people within individual image database 234. Each person in individual image database may have more than one image associated with them.

List of hash values 310 may include a hash value associated with each person in individual image database 234. The hash values may be predetermined or determined by a the system by using hash value algorithms.

Referring now to FIG. 4, a block diagram of an example table 237 associated with allocation database 236 is shown, according to some embodiments. Allocation database 236 may include lists of people 402, classifications 404, present at meeting identifiers 406, number of meetings attended 408, and number of meetings missed 410. In some embodiments, each row in allocation database 236 may be associated with an individual employee of a company. Allocation database 236 may be dynamic so people can be added or removed at any time. Further, each column may not be filled out for each employee.

In some embodiments, list of example employees 402 may include any number of people with any number of names. Each employee may be associated with a classification as in classifications list 404 so a person looking at results in the database can easily see what group the person is a part of and how the group correlates with the other columns.

List of present at meeting identifiers 406 may represent whether a person was present at a specific meeting. If the person was present, management server 210 can identify the person from a picture taken by image capture device 202 of each individual at the meeting and update allocation database 236 indicating the person was at the meeting. If management server 210 does not identify the person in the picture, management server 210 can update allocation database 236 accordingly.

List of number of meetings attended 408 can include an aggregated total of all the meetings each person has attended for a set time period, such as, but not limited to a year. Every time a person attends a meeting, management server 210 can update the number of meetings attended column associated with that person.

Similarly, list of number of meetings missed 410 can include an aggregated total of all the meetings each person was supposed to attend but missed within the set time period. Every time a person misses a meeting they were supposed to attend, management server 210 can update number of meetings missed 410 accordingly.

Further, allocation database 236 can be updated by record generator 232 when record generator 232 sends a record with new data to allocation database 236. For example, record generator 232 may send a record to allocation database 236 which includes data indicating whether an employee was present at a specific meeting or not. Once allocation database 236 receives the record, allocation database 236 can add to columns 408 or 410 for the employees that were supposed be present at the meeting depending on if they were identified in image of everyone present at the meeting. For example, if John Smith, John Doe, and Jane Doe, shown in figure in FIG. 4, were supposed to be present at a meeting. The meeting could occur and a picture could be taken showing all the individuals at the meeting. Management server 210 could identify the individuals in the picture and add information into allocation database 236 indicating who was present at the meeting and was not, updating each field accordingly.

Figure 5:
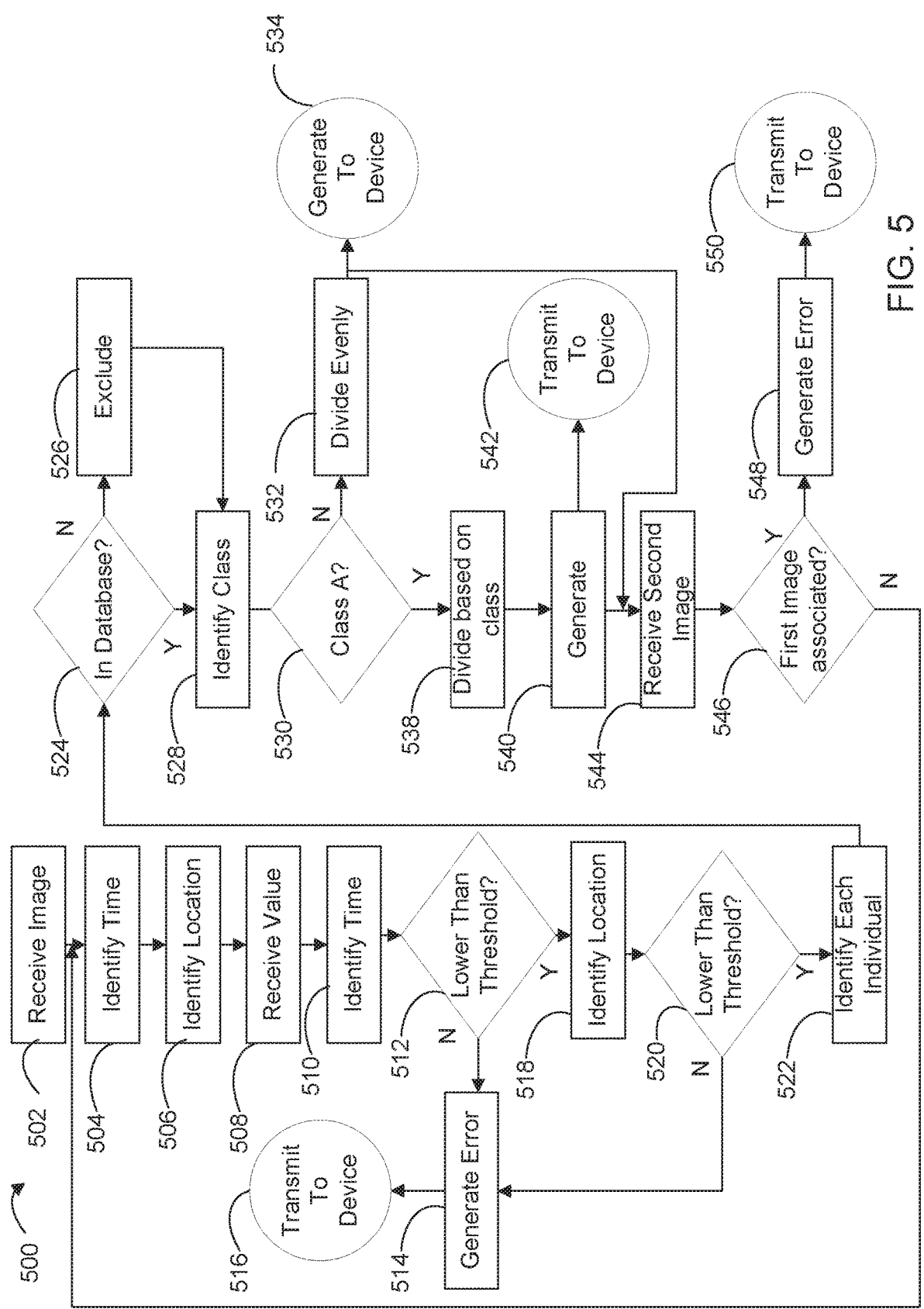
FIG. 5 is a flowchart showing a process for receiving an image and a value associated with the image input and generating an output based on characteristics of the image and the value, according to some implementations.

Referring now to FIG. 5, a flowchart showing a process 500 for receiving an image input and a value associated with the image and generating an output based on characteristics of the image and the value is shown. In the example embodiment, process 500 may be performed by management server 210 (shown in FIG. 2) cooperating with image capture device 202.

At operation 502, management server 210 may receive an image. The image may be received from image capture device 202, but the image may come from any source. Further, the image may already be tagged with a location and time representing the location and time that the image was taken.

At operation 504, management server 210 can identify the time associated with the image. Management server 210 can identify the time based on metadata associated with the picture or by identifying a tag (e.g., a time stamp) generated by image capture device 202 and associated with the image.

At operation 506, management server 210 can identify the location associated with the image. Management server 210 can identify the location based on metadata associated with the picture, by identifying a location tag generated by image capture device 202 and associated with the image, or by analyzing characteristics of the image and comparing the characteristics with images in individual image database 234, as previously described in relation to FIGS. 2-4.

At operation 508, management server 210 can receive a value. The value may be received from image capture device 202, but the value may come from any source. Further the value may come as a second picture, or the value may come as a user input. The value may already have tags describing the time and location that the value was generated, or management server 210 may determine the time and location of the value similar to how management server 210 determined the time and location of the image. Further, management server can determine what the value is based on a user input or based on characteristics of the value or image including the value.

At operation 510, management server 210 can identify the time the value was generated based on the tag associated with the time and the value (e.g. via any implementations discussed above, such as the description of management server 210 identifying the time associated with the picture in operation 504.

At operation 512, management server 210 can determine if the difference between the times associated with the value and the picture is lower than a threshold. For example, management server 210 may calculate a difference between a time associated with the value and a time associated with the picture (e.g. in seconds, minutes, days, or any other time scale), and may compare the difference to one or more thresholds as discussed above, or may calculate a validity score in some implementations for ordering by priority. In implementations using thresholds, the thresholds may be set by a user, by an administrator, or by a manufacturer of the system.

At operation 514, management server 210 can generate an error message if the difference determined in operation 512 was too great. At operation 516, management server 210 can transmit this error message to a second device.

At operation 518, if the difference calculated in operation 512 is below a threshold, management server 210 can identify the location associated with the value. Management server 210 can identify the location by comparing the location tag associated with the value with location tags in individual image database 234.

At operation 520, management server 210 can determine if the distance between the locations of the image and the value are below a threshold. Management server 210 can perform this operation by using a user selected threshold by determining the distance between the locations where the value and image were created. If the distance is greater than the threshold, an error is generated at operation 514. In some embodiments, management server 210 can determine the location of management server 210 and determine the distance between management server 210 and the locations associated with the value and image. If the distance is above a threshold, management server 210 can generate and transmit an error message to a second device.

At operation 522, management server 210 can identify each individual in the image. To do so, management server 210 can obtain pictures of each individual in the image and compare the pictures to pictures of individuals in individual image database 234. Management server 210 can identify matches between the pictures.

At operation 524, management server 210 can determine if there are individuals within the image that are not in either database 234, and 236. Each individual in the image that is not individual image database 234 can be excluded at operation 526. Each individual that has a match in individual image database 234 can be added to a list including identified individuals.

At operation 528, management server 210 can identify the class of each identified individual in the picture. Management server 210 can identify the class of each individual by identifying the information in individual image database 234.

At operation 530, management server 210 can determine if there is one or a plurality of classes in the list of identified individuals. If each identified individual is a member of the same class, the value can be divided evenly in operation 532 and generated and transmitted to a second device, such as allocation database 236, in operation 534.

If the identified individual list includes individuals from different classes, however, at operation 538, management server 210 can assign the value based on the class of each identified individual. After the value is assigned, a record is generated at operation 540 indicating the portion of the value that is associated with each individual and, at operation 542, the record is transmitted to a second device, such as allocation database 236. The record may be in any suitable type and form, such as XML data, a flat file, a database file, a set of parameter-value pairs for a query to an allocation database, comma separated values of user identifier and assigned values, or any other such structures.

At operation 544, management server 210 may receive a second image from image capture device 202 or from any other device. The second image may include any subject and can be generated in error by a user at image capture device 202 or purposely to receive a second reimbursement, for example.

At operation 546, management server 210 may determine if management server 210 has already associated a first image with the value. If management server 210 has associated a first image with the value, management server 210 can generate an error message at operation 548 and transmit the error message to a second device at operation 550. However, if management server 210 has not associated a first image with the value, process 500 may return to operation 504.

In one implementation, after the second device receives the associated image and value, the second device can generate different lists including information in the associated image such as expense reports, attendance rosters, shopping lists, etc.

Accordingly, the systems and methods discussed herein may be used for easy, efficient data entry, encouraging compliance by enterprise users and automatically detecting invalid or fraudulent entries. In some implementations, a user may take a photo of one or more individuals present at an event (e.g. lunch, meeting, business trip, etc.) and may also take a photo of a receipt from a vendor (e.g. restaurant, taxi, or any other good or service) or enter relevant data from the receipt. An image recognition system, using a database of facial images such as an employee directory, social media site, or other such source, may identify individuals present in the photo and may allocate some or all of a value identified on the receipt (e.g. cost of food, travel, meeting expense, etc.) to the individuals. Such allocations may be evenly divided or proportionally weighted, e.g. based on classification of the individual within the enterprise (e.g. manager, supervisor, executive, senior or junior employee, etc.), such that the enterprise may perform reimbursement and/or budget management. The data may be validated using metadata of the photo or photos, such as time/date information, geolocation information, OCR recognized information (e.g. values visible on a receipt such as a total cost, time and date information, a name and/or location of the vendor, etc.), or other such information, as well as differences between metadata of the photos (e.g. times or locations at which each photo was taken). In some implementations, the photos or entered or extracted values may also be associated on a one-to-one basis, preventing allocating multiple receipts to the same group of individuals based on a single picture. Data identified as potentially invalid may trigger warnings, either for the user entering the data (allowing re-entry or correction of the data or photos) or an administrator, or may be automatically excluded from reimbursement or budgeting. Thus, users need not manually identify each person present at an event and/or their proportional budget allocations for the event, while still obtaining all relevant data, increasing compliance and avoiding user frustration.

These systems and methods can also be used in other contexts, such as identifying attendance at an event (e.g. meeting or conference), or for recognizing items in a physical shopping cart or basket from photos for automatic payment systems, receipt validation, or other such uses. In one implementation of an example embodiment, image capture device 202 can capture a picture of items in a physical shopping cart retrieved from a shopping center. Image capture device 202 can then send the picture to management server 210 through network 208. Management server 210 can receive the picture, identify each object within the shopping cart from individual image database 234, and determine a value associated with each item in the shopping cart. In some embodiments, instead of determining a value associated with each item, a user can input a value associated with each device into image capture device 202. Management server 210 can then aggregate the values associated with each item to obtain a final value and transmit a final value to a second device such as a database or a credit card company. The database or credit card company can assign a value to an account associated with the user that took the picture of the items in the shopping cart. In some embodiments, management server 210 can determine which shopping center or grocery store the shopping cart is in based on location data associated with the picture. In some embodiments, management server 210 can also determine the time and date the picture was taken.

In some embodiments, before identifying the items in the shopping cart, management server 210 can determine the location the picture was taken and compare it to the location of the shopping center. If the distance between the location of the picture and the shopping center is too large, management server 210 can return an error message to image capture device 202 or an administrative device. Similarly, management server 210 can determine the time the picture was taken. If the time is too long after the time the shopping center closes, management server 210 can return an error message.

In one implementation of an example embodiment, image capture device 202 can capture a picture of a group of individuals present at a meeting. In this implementation, image capture device 202 can capture the picture and send the picture to management server 210. Management server 210 can receive the picture and identify each person present at the meeting by identifying each person from individual image database 234. In some embodiments, management server 210 can determine who is not in the meeting based on a roster including a list of people that should be at the meeting uploaded from image device 202, uploaded from a second device, already present in individual image database, or in a database already in management server 210. After determining who is present at the meeting, management server 210 can update a second database, such as allocation database 236, indicating who was present at the meeting. A similar process can be used to determine who attended a sporting event or concert and how many people attended these events. In some embodiments, management server 210 can determine which conference room and business the meeting is in based on location data associated with the picture. In some embodiments, management server 210 can also determine the time and date the picture was taken.

In some embodiments, before identifying the people present at the meeting, management server 210 can determine the location that the picture was taken and compare it to the location where the meeting was supposed to be. If the distance between the location of the picture and the meeting is too large, management server 210 can return an error message to image capture device 202 or an administrative device. Similarly, management server 210 can determine the time the picture was taken. If the time is too long after the time the meeting ends, management server 210 can return an error message.

Accordingly, the systems and methods discussed herein provide for object identification that allows a server to automatically update a database based on the association between a picture and a value. Object identification may include identifying characteristics associated with the time and location of a picture along with identifications of numbers and individuals to determine different characteristics of pictures and the individuals. Further, by taking into account time-specific and location-specific characteristics of pictures and values, the association between pictures and the values allows for improved fraud detection based on the times and locations that the picture and value are received.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method, comprising:
   receiving, by a device, a first image of a plurality of individuals;
   identifying, by the device from a database comprising images of individuals, a plurality of individuals within the first image;
   for each identified individual within the first image, associating, by the device, the identified individual with a first value; and
   generating, by the device, a record comprising identifications of each identified individual within the first image and the first value, the record transmitted by the device to a second device.

2. The method of claim 1, wherein each of the first image and the first value is associated with a common characteristic related to generation of the image and receipt of the value by the device; and further comprising:
   determining, by the device, that a difference between the characteristic associated with the first image and the characteristic associated with the first value is less than a threshold.

3. The method of claim 2, wherein associating each identified individual within the first image with the first value is performed responsive to the determination that the difference is less than the threshold.

4. The method of claim 2, wherein the characteristic associated with the first image comprises a time to generate the first image, the characteristic associated with the first value comprises a time of receipt of the first value by the device, and the threshold comprises a duration between two time characteristics.

5. The method of claim 2, wherein the characteristic associated with the first image comprises a location at which the first image was generated, the characteristic associated with the first value comprises a location of the device during receipt of the first value by the device, and the threshold comprises a distance between two location characteristics.

6. The method of claim 2, further comprising:
   associating the first image and the first value, by the device, responsive to the determination that the difference is less than the threshold;
   receiving, by the device, a second image of a plurality of individuals and the first value; and
   transmitting, by the device to the second device, an indication that an association between the second image and the first value is invalid, responsive to the first image and the first value being associated.

7. The method of claim 6, wherein a difference between a characteristic associated with the second image and the characteristic associated with the first value is less than the threshold; and wherein transmitting the indication that the association between the second image and the first value is invalid is performed despite the difference between the characteristic associated with the second image and the characteristic associated with the first value being less than the threshold.

8. The method of claim 1, wherein associating each identified individual with the first value further comprises:
   determining a number of individuals within the first image; and
   for each identified individual, associating the identified individual with a second value comprising the first value divided by the number of identified individuals.

9. The method of claim 1, wherein associating each identified individual with the first value further comprises:

retrieving, by the device from the database, a classification of each identified individual within the first image;

associating, by the device, a first individual of the identified individuals with the first value, responsive to the first individual having a first classification; and associating, by the device, at least one additional individual of the identified individuals with a second value, responsive to each additional identified individual having a different, second classification.

10. A system for generating associations between optical entered data sets, comprising:

a device comprising a processor in communication with an image capture device, a memory for storing a database of images of individuals, and a network interface;

wherein the processor is configured to:
receive, from the image capture device, a first image of a plurality of individuals, and a second image that includes a first value, identify, from the database, a plurality of individuals in the first image, and for each identified individual in the first image, associate the identified individual with the first value, and generate a record comprising identifications of each identified individual within the first image and the association with the first value; and wherein the network interface is configured to transmit, to a second device, the generated record.

11. The system of claim 10, wherein each of the first image and the second image is associated with a common characteristic related to generation of the image and receipt of the value by the first device and wherein the processor is further configured to:

determine that a difference between the image characteristic associated with the first image and the image characteristic associated with the second image is less than a threshold.

12. The system of claim 11, wherein the processor is further configured to associate each identified individual within the first image with the first value, responsive to the determination that the difference is less than the threshold.

13. The system of claim 11, wherein the common characteristic comprises a time to generate the image, and the threshold comprises a duration.

14. The system of claim 11, wherein the common characteristic comprises a location at which the image was generated, and the threshold comprises a distance between two location characteristics.

15. The system of claim 11, wherein the processor is further configured to:

associate the first image and the second image, responsive to the determination that the difference is less than the threshold, and receive, from the image capture device, a third image of a plurality of individuals and the second image comprising the first value; and wherein the network interface is further configured to transmit, to the second device, an indication that an association between the first image and the third image is invalid, responsive to the first image and the second image being associated.

16. The system of claim 15, wherein a difference between an image characteristic associated with the third image and the image characteristic associated with the second image is less than the threshold; and wherein transmitting the indication that the association between the third image and the first value is invalid is performed despite the difference between the characteristic associated with the second image and the characteristic associated with the first value being less than the threshold.

17. The system of claim 10, wherein the processor is further configured to:

determine a number of individuals within the first image; and for each identified individual, associate the identified individual with a second value comprising the first value divided by the number of identified individuals.

18. The system of claim 10, wherein the processor is further configured to:

retrieve, from the database, a classification of each identified individual in the first image;

associate a first individual of the identified individuals with the first value, responsive to the first individual having a first classification; and associate at least one additional individual of the identified individuals with a second value, responsive to each additional identified individual having a different, second classification.

19. A non-transitory computer-readable medium, comprising instructions that, when executed by the processor of a device, cause the processor to:

receive, from an image capture device in communication with the device, a first image of a plurality of individuals, and a second image comprising a first value;

identify, from a database comprising images of individuals, each of the plurality of individuals in the first image;

for each identified individual of plurality of individuals in the first image, associate the identified individual with the first value; and generate, to a second device, a record comprising identifications of each identified individual within the first image and the association with the first value.

20. The computer-readable medium of claim 19, further comprising instructions that cause the processor to:

determine that a difference between an image characteristic associated with the first image and an image characteristic associated with the first value is less than a threshold;

responsive to the determination that the difference is less than the threshold,
associate each identified individual within the first image with the first value, and
associate the first image and the second image;

receive, from the image capture device, a third image of a plurality of individuals, the third image comprising the first value; and transmit, to the second device, an indication that an association between the third image and the second image is invalid, responsive to the first image and the second image being associated.

* * * * *